US010797598B1

(12) United States Patent
Malla et al.

(10) Patent No.: US 10,797,598 B1
(45) Date of Patent: Oct. 6, 2020

(54) CALIBRATED RIPPLE INJECTION-BASED CONSTANT ON-TIME BUCK CONVERTER WITH PRE-BIAS STARTUP IN CONTINUOUS CONDUCTION MODE

(71) Applicant: Microchip Technology Incorporated, Chandler, AZ (US)

(72) Inventors: Venkata Murali Krushna Malla, Austin, TX (US); Surya Prakash Rao Talari, San Jose, CA (US); Ioan Stoichita, Campbell, CA (US); Matthew Weng, San Ramon, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/601,640

(22) Filed: Oct. 15, 2019

Related U.S. Application Data

(60) Provisional application No. 62/874,713, filed on Jul. 16, 2019.

(51) Int. Cl.
*H02M 1/14* (2006.01)
*H02M 1/00* (2006.01)
*H02M 3/158* (2006.01)

(52) U.S. Cl.
CPC ............. *H02M 3/158* (2013.01); *H02M 1/14* (2013.01); *H02M 1/143* (2013.01); *H02M 2001/0025* (2013.01)

(58) Field of Classification Search
CPC .................. H02M 1/14; H02M 1/143; H02M 3/158–1588; H02M 2001/0025
See application file for complete search history.

(56) References Cited

U.S. PATENT DOCUMENTS

| 8,872,497 | B2 * | 10/2014 | Nakashima | ........... H02M 3/156 |
| | | | | 323/285 |
| 9,270,176 | B1 * | 2/2016 | Nguyen | ................ H02M 3/156 |
| 9,716,435 | B2 * | 7/2017 | Radhakrishnan | ....... H02M 1/00 |
| 2002/0125872 | A1 * | 9/2002 | Groom | ................... H02M 3/156 |
| | | | | 323/288 |

(Continued)

FOREIGN PATENT DOCUMENTS

EP    3032731 A1    6/2016

*Primary Examiner* — Thienvu V Tran
*Assistant Examiner* — Sisay G Tiku
(74) *Attorney, Agent, or Firm* — Burr & Forman LLP; Ryan M. Corbett

(57) ABSTRACT

According to an aspect of one or more exemplary embodiments, there is provided a constant on-time controller for a buck converter with calibrated ripple injection in continuous conduction mode. The constant on-time controller may include a pulse width modulator (PWM) comparator that generates an on-time request, an error amplifier that regulates an average feedback voltage to an internal reference voltage, and passes a feedback node ripple signal to an input of the PWM comparator, an on-time generator that outputs an on-time signal that controls an on-time of the buck converter based on the on-time request, a MOSFET driver that drives the buck converter based on the output of the on-time generator, and an injection signal generator coupled to the on-time generator, wherein the injection signal generator may include a first switch and a second switch, a fixed signal generator, and a bias current source.

19 Claims, 16 Drawing Sheets

(56) References Cited

U.S. PATENT DOCUMENTS

| | | | | |
|---|---|---|---|---|
| 2008/0088284 A1* | 4/2008 | Weng | ........... | H02M 3/1563 |
| | | | | 323/271 |
| 2008/0088292 A1* | 4/2008 | Stoichita | ........... | H02M 3/156 |
| | | | | 323/285 |
| 2009/0284235 A1* | 11/2009 | Weng | ........... | H02M 3/156 |
| | | | | 323/222 |
| 2010/0301825 A1* | 12/2010 | Yamaguchi | ........... | H02M 3/1588 |
| | | | | 323/284 |
| 2011/0291626 A1* | 12/2011 | Murakami | ........... | H02M 3/156 |
| | | | | 323/271 |
| 2012/0206121 A1 | 8/2012 | Evans | | |
| 2012/0274296 A1* | 11/2012 | Higuchi | ........... | H02M 3/156 |
| | | | | 323/282 |
| 2012/0274300 A1* | 11/2012 | Nakashima | ........... | H02M 3/156 |
| | | | | 323/284 |
| 2013/0249508 A1* | 9/2013 | Rahimi | ........... | H02M 3/156 |
| | | | | 323/271 |
| 2013/0249511 A1* | 9/2013 | Kalje | ........... | H02M 3/1588 |
| | | | | 323/271 |
| 2015/0381037 A1* | 12/2015 | Romeo | ........... | H02M 3/156 |
| | | | | 323/282 |
| 2016/0294277 A1* | 10/2016 | Romeo | ........... | H02M 3/1582 |
| 2016/0315538 A1 | 10/2016 | Nguyen | | |
| 2017/0201175 A1* | 7/2017 | Chen | ........... | H02M 1/08 |
| 2018/0337599 A1* | 11/2018 | Chen | ........... | H02M 3/158 |

* cited by examiner

US 10,797,598 B1

CALIBRATED RIPPLE INJECTION-BASED CONSTANT ON-TIME BUCK CONVERTER WITH PRE-BIAS STARTUP IN CONTINUOUS CONDUCTION MODE

CROSS REFERENCE TO RELATED APPLICATION

This application claims the benefit of U.S. Provisional Patent Application No. 62/874,713, filed on Jul. 16, 2019, which is incorporated by reference in its entirety.

FIELD

The present disclosure relates to prebias start up in a constant on time (COT) step down (Buck) converter/regulator with calibrated ripple injection with continuous conduction mode (CCM).

BACKGROUND

Step down switching converters (Buck converters) are commonly used whenever DC voltage step down is required. Buck converters can be divided into two categories: Synchronous and Asynchronous. FIG. 1 shows a prior art synchronous buck converter. If Q2 in FIG. 1 is replaced by a diode, it becomes an asynchronous buck converter. A synchronous buck converter allows reverse current, whereas the asynchronous buck converter does not allow reverse current to flow.

A synchronous buck converter can be operated as an asynchronous buck converter by turning off the low side MOSFET (Q2 in FIG. 1) whenever reverse current (current from drain terminal to source terminal) is detected though it, which improves very light load efficiency.

The output voltage of a buck converter is generally 0V before the converter is enabled. Prebias startup is a special scenario where an external voltage is present at the output of a converter before the converter is enabled. This is the case where multiple power rails in a system have parasitic diodes between their outputs. In this case, it is important to ensure that the converter, which has a voltage present on its output, does not sink current from the other power rail when it is enabled through these parasitic diodes.

Traditionally, synchronous buck converters are operated in asynchronous mode (also known as discontinuous conduction mode) and switching is initiated only when the internal reference voltage exceeds the voltage present on its feedback pin to ensure proper prebias startup (i.e., prebias startup without sinking current from the other power rail). When a buck converter is operated in an asynchronous mode, it does not allow reverse current and hence it does not sink current from the other power rail which pre-biases the converter output. Ensuring proper prebias startup sometimes also requires additional circuitry to limit any initial negative average current when the converter starts switching.

SUMMARY

According to an aspect of one or more exemplary embodiments, there is provided a constant on-time controller for a buck converter. The constant on-time controller may include a pulse width modulator (PWM) comparator that generates an on-time request, an error amplifier that regulates an average feedback voltage to an internal reference voltage, and passes a feedback node ripple signal to an input of the PWM comparator, an on-time generator that outputs an on-time signal that controls an on-time of the buck converter based on the on-time request, a MOSFET driver that drives the buck converter based on the output of the on-time generator, and an injection signal generator coupled to the on-time generator, wherein the injection signal generator may include a first switch and a second switch, a fixed signal generator, and a bias current source.

The first switch may be coupled to the second switch, and the first and second switches may be coupled to the fixed signal generator, and to an output of the injection signal generator. The bias current source may be coupled between the first and second switches and the output of said injection signal generator, and the error amplifier may receive a feedback voltage based on the output of the injection signal generator.

The injection signal generator may include an AND gate having an output that is coupled to the second switch, a first input that is coupled via an inverter to the fixed signal generator, and a second input that is coupled to a flip flop that receives the on-time request from the PWM comparator.

The flip flop may include an input terminal coupled to a supply voltage, a clock terminal that is coupled to the output of the PWM comparator, and a clear terminal that is coupled to an enable signal of the controller.

The bias current source may be a constant or adaptive bias current source. The bias current source may be an adaptive bias current source that generates a bias current based on a comparison of the feedback voltage to a reference voltage.

According to an aspect of one or more exemplary embodiments there may be provided a device having a buck converter power stage, a controller coupled to the buck converter power stage, and a ripple voltage circuit coupled to the buck converter power stage output and the controller. The controller may include a pulse width modulator (PWM) comparator that generates an on-time request and is coupled to a feedback terminal of the controller, an on-time generator that outputs an on-time signal that controls an on-time of the buck converter based on the on-time request, a MOSFET driver that drives the buck converter based on the output of the on-time generator, and an injection signal generator coupled to the on-time generator. The injection signal generator may include a first switch and a second switch, a fixed signal generator, and a bias current source.

The first switch may be coupled to the second switch. The first and second switches may be coupled to the fixed signal generator, and to an output of the injection signal generator. The bias current source may be coupled between the first and second switches and the output of said injection signal generator. The PWM comparator may receive a feedback voltage based on the output of the injection signal generator.

The ripple voltage circuit may include an injection resistor, and injection capacitor, and a bias resistor. The injection resistor may include a first terminal coupled to the output of the injection signal generator and a second terminal coupled to said injection capacitor. The bias resistor may include a first terminal coupled to the first terminal of the injection resistor and a second terminal coupled to ground. The injection capacitor may include a first terminal coupled to said second terminal of said injection resistor and a second terminal coupled to said feedback terminal of the controller.

The ripple voltage circuit may also include a resistive voltage divider having a first resistor and a second resistor, and a feed forward capacitor coupled in parallel with the first resistor of said resistive voltage divider. The feedback terminal of the controller may be coupled between the first and second resistors of said resistive voltage divider, and an output of the buck converter may be coupled to the first resistor of the resistive voltage divider and the feed forward capacitor.

The injection signal generator may also include an AND gate having an output that is coupled to the second switch, a first input that is coupled via an inverter to the fixed signal generator, and a second input that is coupled to a flip flop that receives the on-time request from the PWM comparator. The flip flop may include an input terminal coupled to a supply voltage, a clock terminal that is coupled to the output of the PWM comparator, and a clear terminal that is coupled to an enable signal of the controller.

The bias current source may be a constant bias current source or an adaptive bias current source that outputs a bias current based on the feedback voltage. The adaptive bias current source may generate a bias current based on a comparison of the feedback voltage to a reference voltage.

According to an aspect of one or more exemplary embodiments, there is provided an injection signal generator for generating a feedback ripple voltage for a buck converter controller. The injection signal generator may include a first switch and a second switch, a fixed signal generator, and a bias current source. The first switch may be coupled to the second switch. The first and second switches may be coupled to the fixed signal generator, and to an output of the injection signal generator. The bias current source may be coupled between the first and second switches and the output of the injection signal generator.

The injection signal generator may also include an AND gate having an output that is coupled to the second switch, a first input that is coupled via an inverter to the fixed signal generator, and a second input that is coupled to a flip flop that receives an on-time request from a pulse width modulator (PWM) comparator. The flip flop may include an input terminal coupled to a supply voltage, a clock terminal that is configured to receive the on-time request, and a clear terminal that is configured to receive an enable signal of the controller.

The bias current source may be a constant bias current source or an adaptive bias current source that outputs a bias current based on the feedback voltage. The adaptive bias current source may generate a bias current based on a comparison of the feedback voltage to a reference voltage.

According to an aspect of one or more embodiments, there is provided a method for controlling a buck converter. The method may include regulating an average feedback voltage to an internal reference voltage, generating an on-time request using a PWM comparator based on a feedback voltage. outputting an on-time signal that controls an on-time of the buck converter based on the PWM comparator on-time request, driving the buck converter based on the on-time signal. creating a feedback voltage ripple using an injection signal generator and external components, outputting a bias current to achieve a target voltage before a controller that controls the buck converter begins switching to ensure proper pre-bias startup, and outputting an injection signal by the injection signal generator which generates a pulse voltage source with a fixed high duration and low for the remaining switching period under steady state conditions

DETAILED DESCRIPTION OF EXEMPLARY EMBODIMENTS

Figure 1:
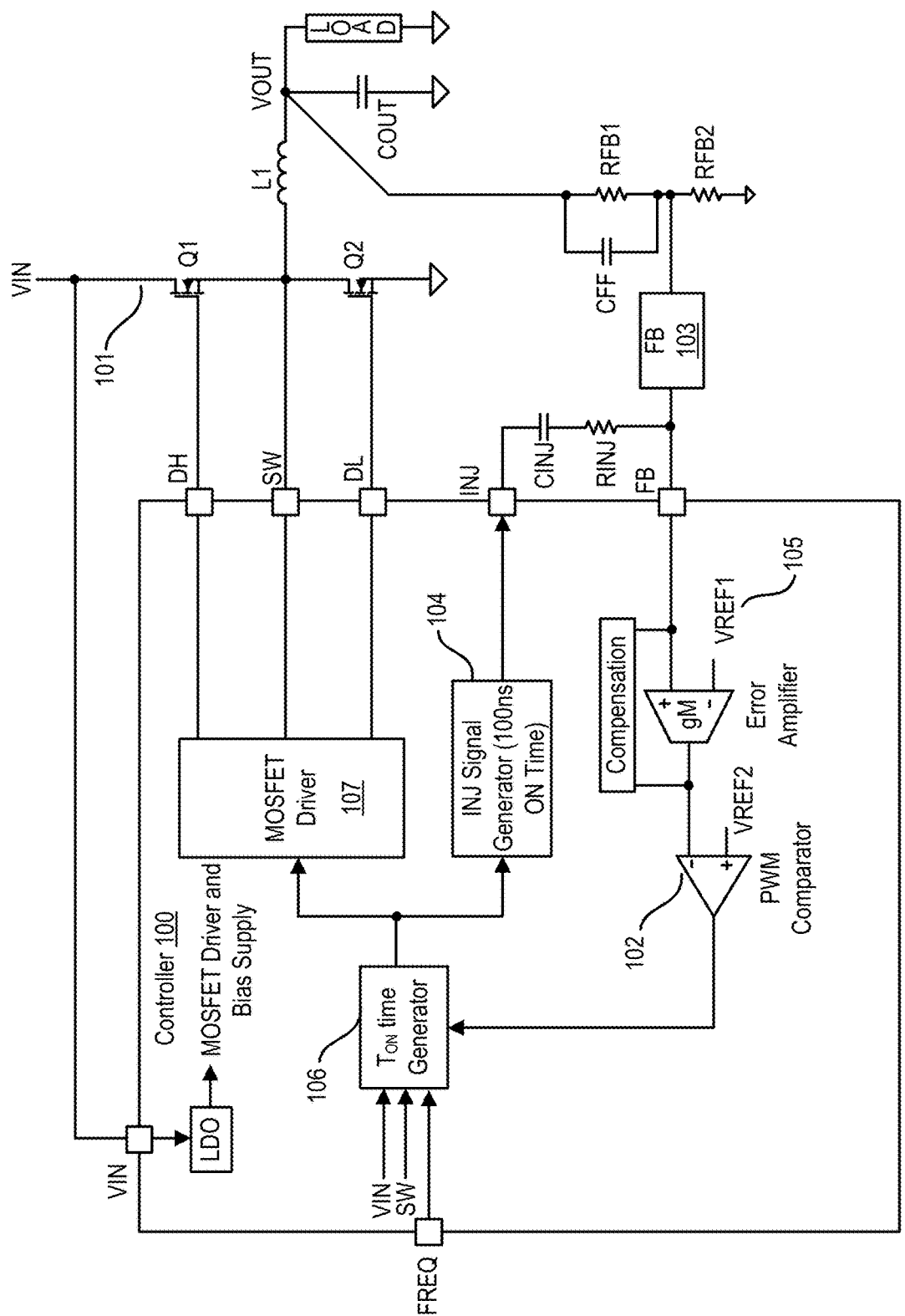
FIG. 1 shows a functional block diagram and a typical application circuit of a constant on time control (COT) buck converter with calibrated ripple injection (default case) according to the prior art.
Figure 2:
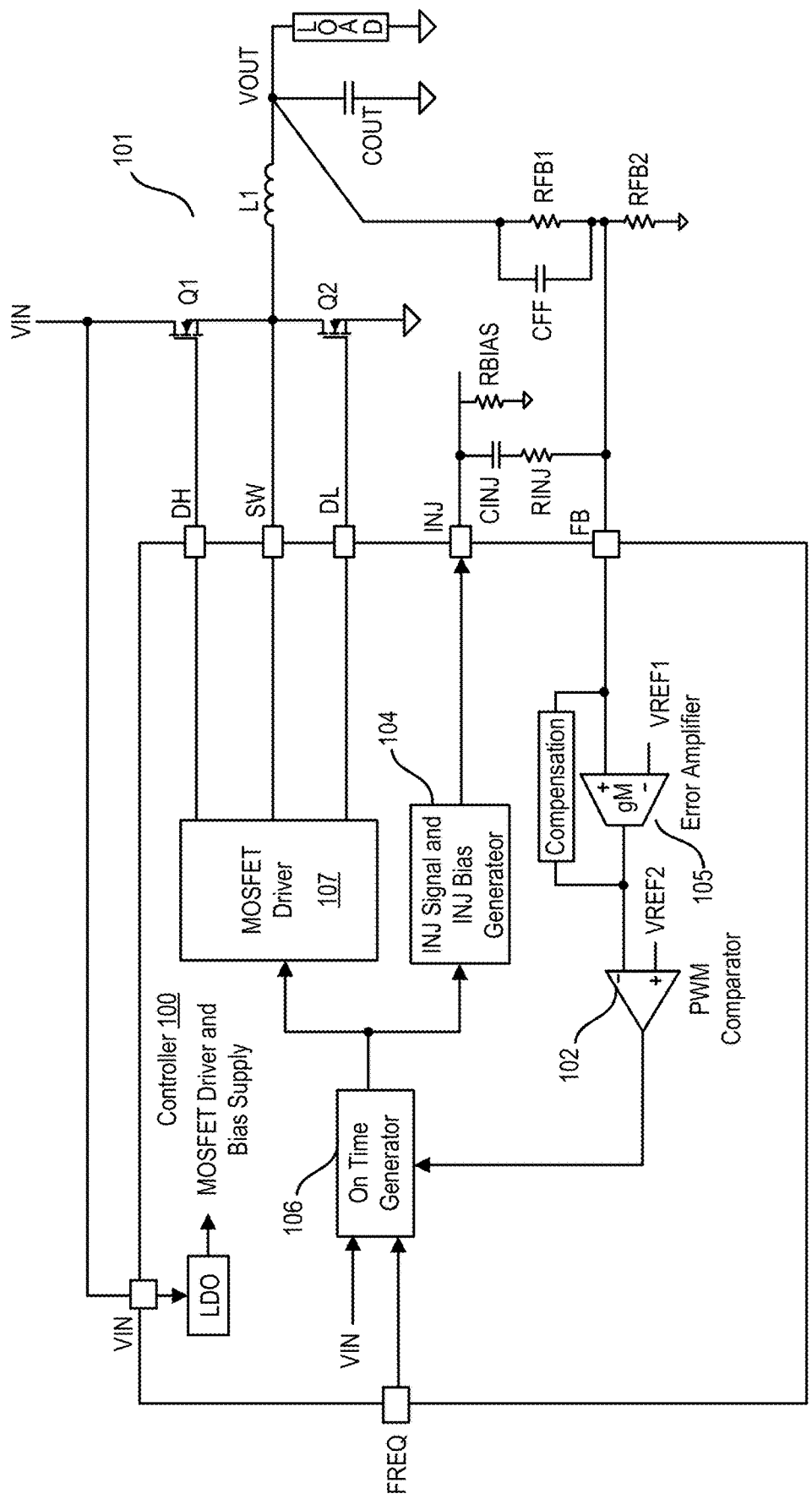
FIG. 2 shows a functional block diagram of a constant on time control (COT) buck converter with calibrated ripple injection with a modified injection (INJ) signal generator according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity. The IC, architecture, method and timing described in FIGS. 1 to 17 are merely exemplary and are not limited to just COT controllers, but can refer to any COT controller where the ripple injection circuit is external or internal or other equivalent alternatives or modified versions which reproduce the spirit of this idea.

FIG. 1 is the functional block diagram and typical application circuit of a COT buck controller 100 with an external ripple injection circuit for controlling a buck converter power stage 101. Controller 100 contains an error amplifier 105 with a compensation circuit, a PWM comparator 102, an adaptive on-time generator 106, a MOSFET gate driver circuit 107, an INJ signal generator 104, and low Dropout Regulator (LDO).

The compensation circuit provides two functions. One is high DC gain which causes the feedback voltage (voltage at FB pin) to track the reference voltage (VREF1). The other function is to pass the generated ripple voltage at the FB pin to the input of the PWM comparator 102.

The PWM comparator 102 compares the valley of the ripple voltage present at its inverting input with a reference voltage, VREF2. The PWM comparator 102 requests the on-time generator 106 to generate an ON time pulse when the valley of the ripple signal at its inverting input is below VREF2.

The on-time generator 106 generates an ON time pulse when the PWM comparator 102 requests it. The ON time pulse generated by the on-time generator 106 adapts with the input voltage VIN and depends on the output voltage and programmed switching frequency. Components connected at the FREQ pin set the switching frequency.

MOSFET driver 107 receives the output from the on-time generator 106 and provides drive signals that drive the external MOSFETs Q1 and Q2 of buck converter power stage 101.

The INJ signal generator 104 generates a fixed 100 ns signal. This signal along with the external components connected at INJ pin is used for generating ripple voltage at the FB pin which is needed for a COT control-based converter. In a typical COT converter, a switch node (SW) is used instead of the INJ node to generate a ripple voltage at the FB pin. Using the INJ signal instead of the SW node to generate the ripple voltage at the FB pin may provide the benefit of constant ripple voltage instead of a ripple voltage that is dependent upon the input voltage, which can be particularly important in applications where the input voltage varies over a wide range and the output voltage is close to the minimum input voltage.

Typically, the INJ signal generator 104 output is high for a fixed time (100 ns in this case) and is low for the remaining duration of the switching period (refer to FIG. 3) when the converter is in steady state and in CCM mode. This creates an average voltage at the INJ pin which can be calculated using the below equation:

$$V_{INJ(Avg)} = V_{INJ} * \frac{t_{ON(INJ)}}{T_{SW}} \quad \text{(Equation 1)}$$

Where, $V_{INJ}$ is the magnitude of the INJ signal when it is high (typically 5V), $t_{ON(INJ)}$ is the duration of INJ signal when it is high, and $T_{Sw}$ is the switching period of the converter.

Figure 9:
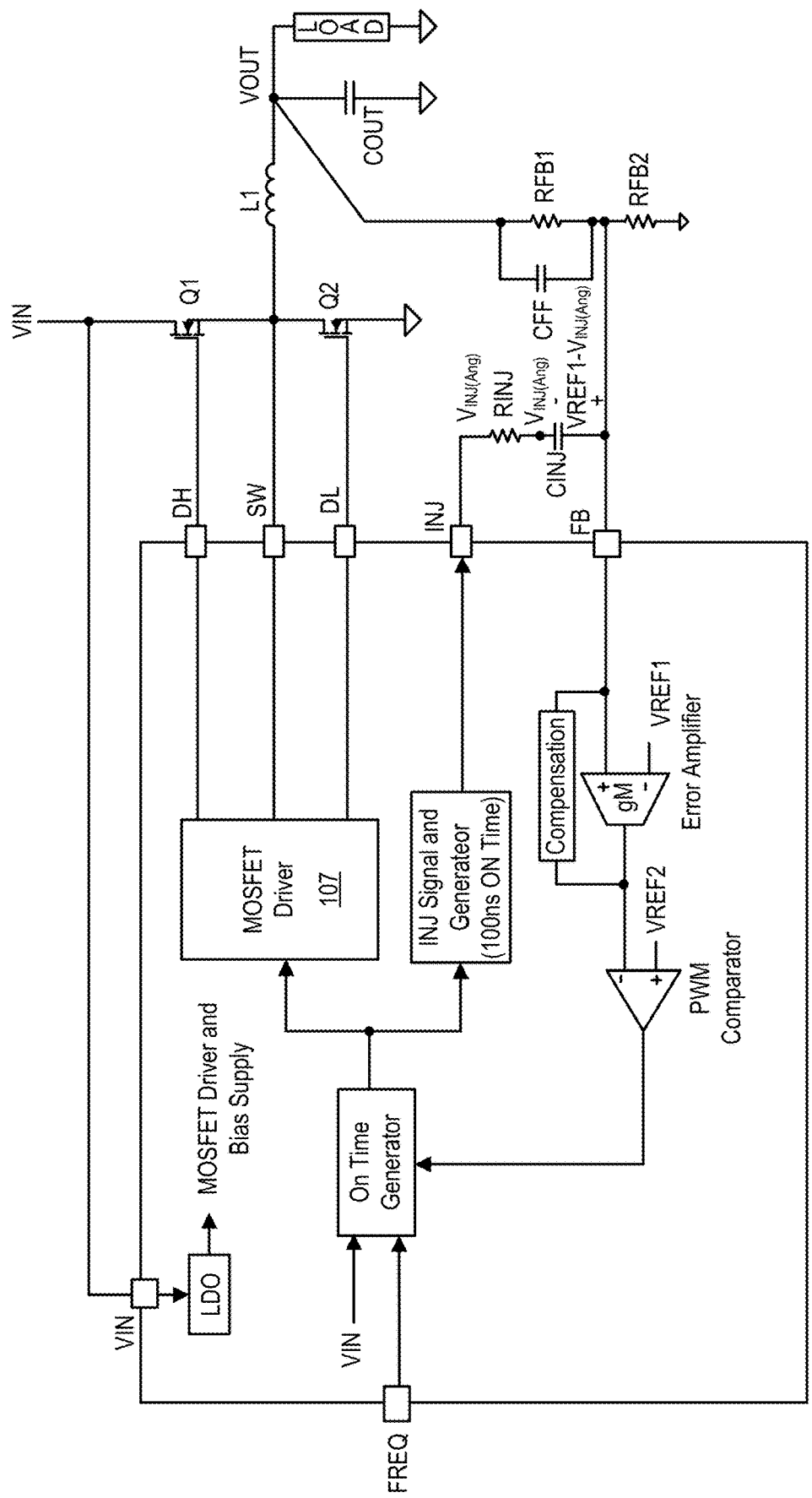
FIG. 9 shows the current directions at the INJ pin during a switching period according to the circuit of FIG. 1.

When the converter is in steady state and in CCM mode, the voltage across CINJ is the difference between VREF1 and the VINJ(Avg) as shown in the FIG. 9. When the INJ output is high, current flows out of the INJ pin, and current flows into the INJ pin during the remaining duration of switching period as shown in FIG. 9. The INJ signal along with CINJ and RINJ acts like a pulse current source with positive and negative amplitude. Under steady state the average current through RINJ is zero which makes the average voltage of the RINJ & CINJ junction node the same as the average voltage of the INJ pin which is given by Equation 1.

The feedforward capacitor CFF provides a low impedance path for the pulse current generated by the INJ signal, CINJ and RINJ. This generates a ripple voltage across CFF and hence at FB pin. The pulse current magnitudes are given by the below equations (by assuming the ripple voltage across CINJ is small compared to the average voltage across it):

$$I_{RINJ(INJH)} = \frac{V_{INJ} - V_{INJ(Avg)}}{R_{INJ}} \quad \text{(Equation 2)}$$

$$I_{RINJ(INJL)} = \frac{V_{INJ(Avg)}}{R_{INJ}} \quad \text{(Equation 3)}$$

Where, $I_{RINJ(INJH)}$ is the magnitude of the current through RINJ when INJ is high, $I_{RINJ(INJL)}$ is the magnitude of the current through RIM when INJ is low, VINJ is the amplitude of INJ signal when it is high (typically 5V), and $V_{INJ(Avg)}$ is the average voltage of INJ pin. $I_{RINJ(INJH)}$ flows for a fixed 100 ns and $I_{RINJ(INJL)}$ flows for the remaining duration of the switching period.

The ripple voltage generated at the FB pin is given by the Equation 4 or Equation 5:

$$\Delta V_{FB} = \frac{I_{RINJ(INJH)} * t_{ON(INJ)}}{CFF} \quad \text{(Equation 4)}$$

$$\Delta V_{FB} = \frac{I_{RINJ(INJL)} * (T_{sw} - t_{ON(INJ)})}{CFF} \quad \text{(Equation 5)}$$

Where CFF is the feedforward capacitor connected across the top resistor (RFB1) of the feedback divider shown in FIG. 1.

The ripple voltage generated at the FB pin is passed to the PWM comparator 102 input by the error amplifier 105 as shown in FIG. 1. By substituting $I_{RINJ(INJL)}$ in to the Equation 5, the ripple voltage at the FB pin can be obtained using the below equation:

$$\Delta V_{FB} = \frac{V_{INJ(Avg)} * (T_{sw} - T_{ON(INJ)})}{R_{INJ} * CFF} \quad \text{(Equation 6)}$$

The ripple voltage, $\Delta V_{FB}$, along with the error between VREF1 and the average FB voltage affects the OFF period of the converter during transients. The ON period is determined by the on-time generator 106.

As can be seen from the Equation 6, the ripple voltage at the FB pin and its falling slope depend on $V_{INJ(Avg)}$, which is the average voltage of the RINJ and CINJ junction node.

The RINJ and CINJ junction node needs some time before it reaches its average value of $V_{INJ(Avg)}$. This time depends on the time constant of the CINJ, RINJ, CFF, RFB1 and RFB2 circuit which is typically in hundreds of microseconds. When the converter starts switching, the initial falling slope of the feedback ripple will be very low as the initial value of the RINJ and CINJ junction node is very low. This causes the converter initial Off time to be longer than intended.

Figure 3:
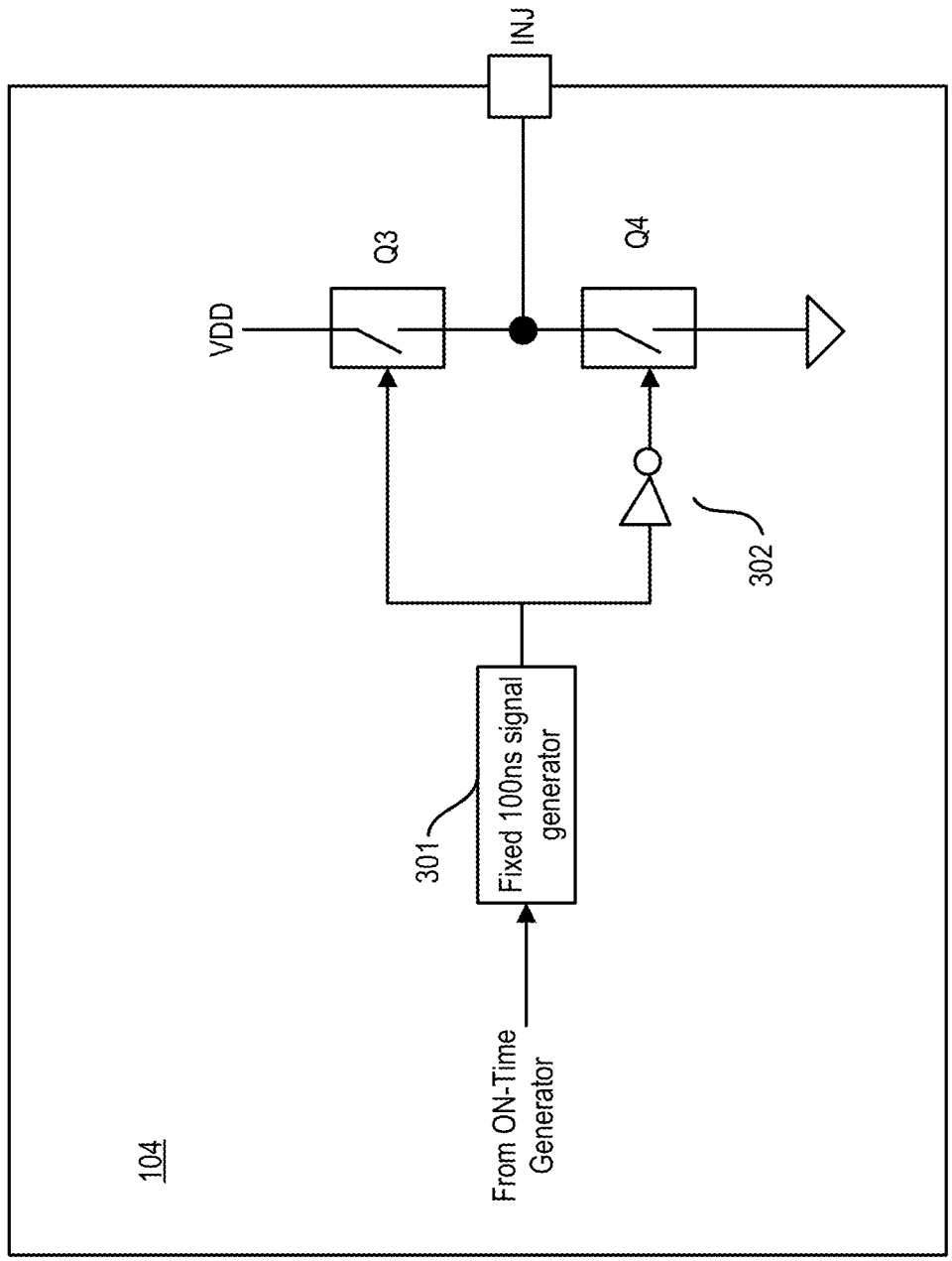
FIG. 3 shows a block diagram of a typical INJ signal generator used in constant on time buck converter with calibrated ripple injection according to the prior art.
Figure 4:
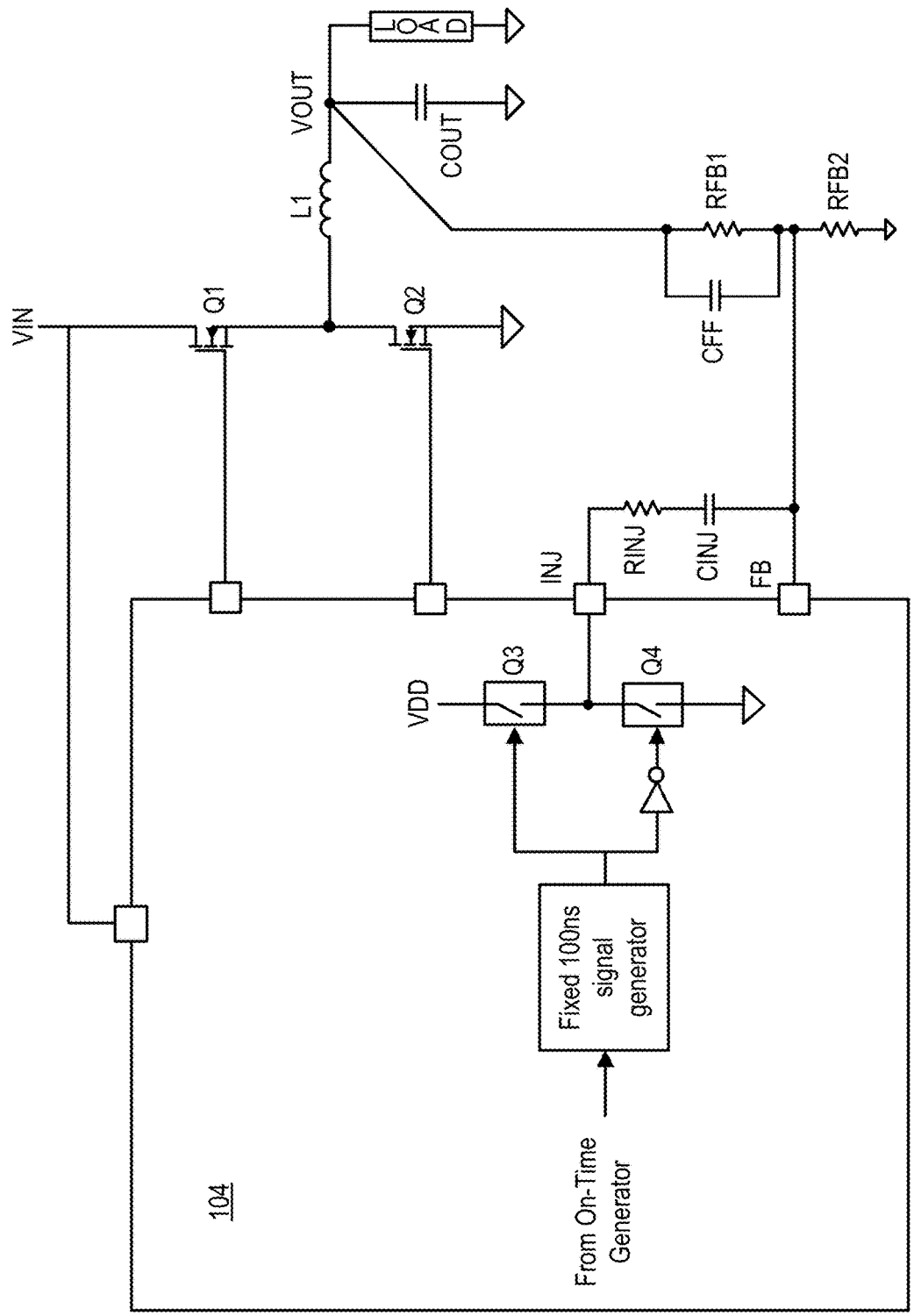
FIG. 4 shows a typical application circuit with a default INJ signal generator according to the prior art.
Figure 10:
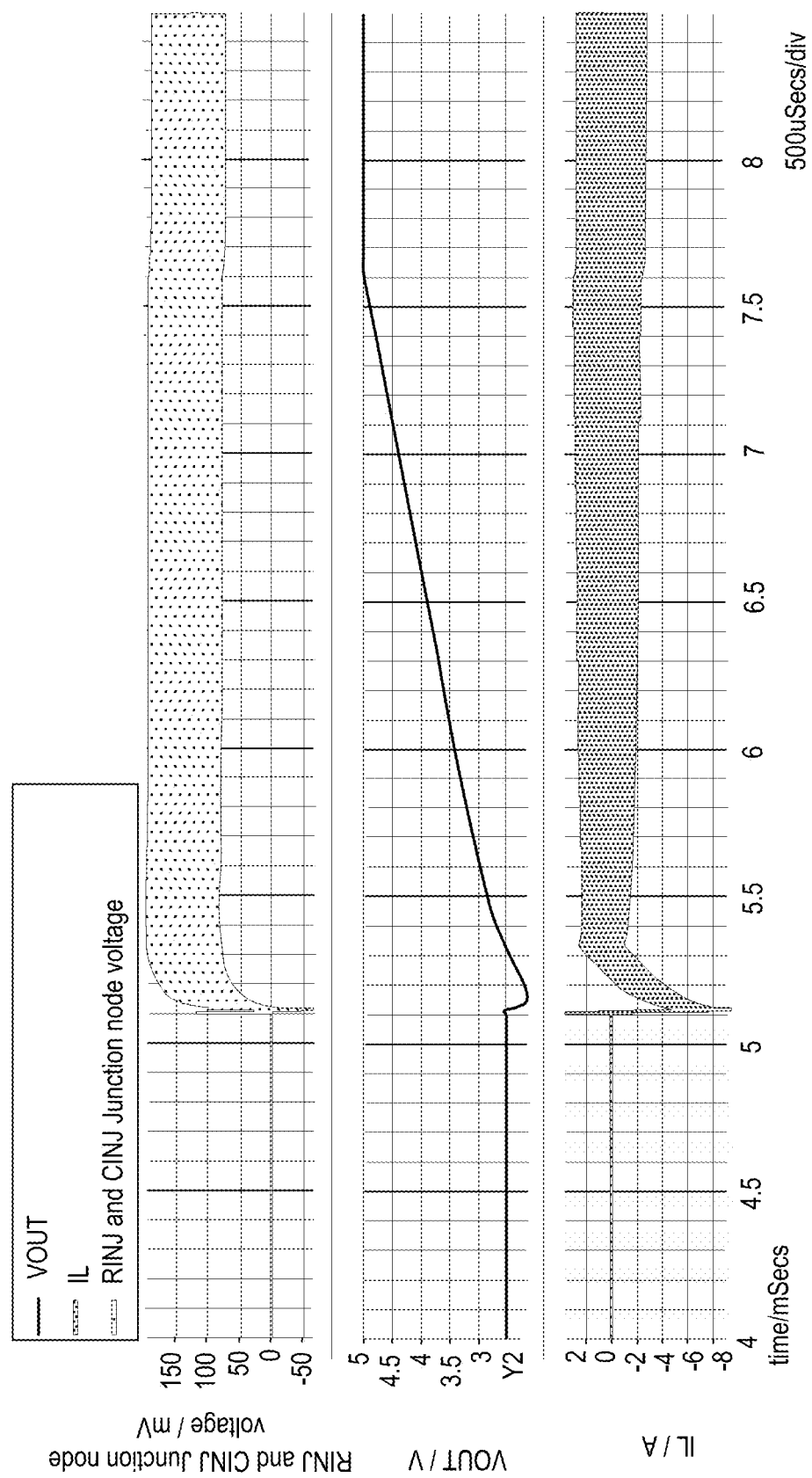
FIG. 10 shows the startup waveforms corresponding to the default INJ signal generated by the circuit of FIG. 1 showing the CINJ & RINJ junction node voltage.

FIG. 10 shows the simulation results of the INJ signal generator shown in FIGS. 1 and 3, and specifically shows the RINJ & CINJ junction node voltage, the output voltage (VOUT) and inductor current (IL) during startup with 2.5V prebias voltage on the output whose target output voltage is 5V. The simulation applies the following parameters used for the simulation: Input Voltage=12V; Target output voltage=5V; switching frequency=250 KHz; Inductor (L1)=2.2 uH; Output capacitors=(2×100 uF, ESR=5 m Electrolytic)+(2×47 uF MLCC); CFF=2.5 nF; RINJ=2KΩ; CINJ=15 nF; RFB1=50KΩ; and RFB2=6.82KΩ

Figure 11:
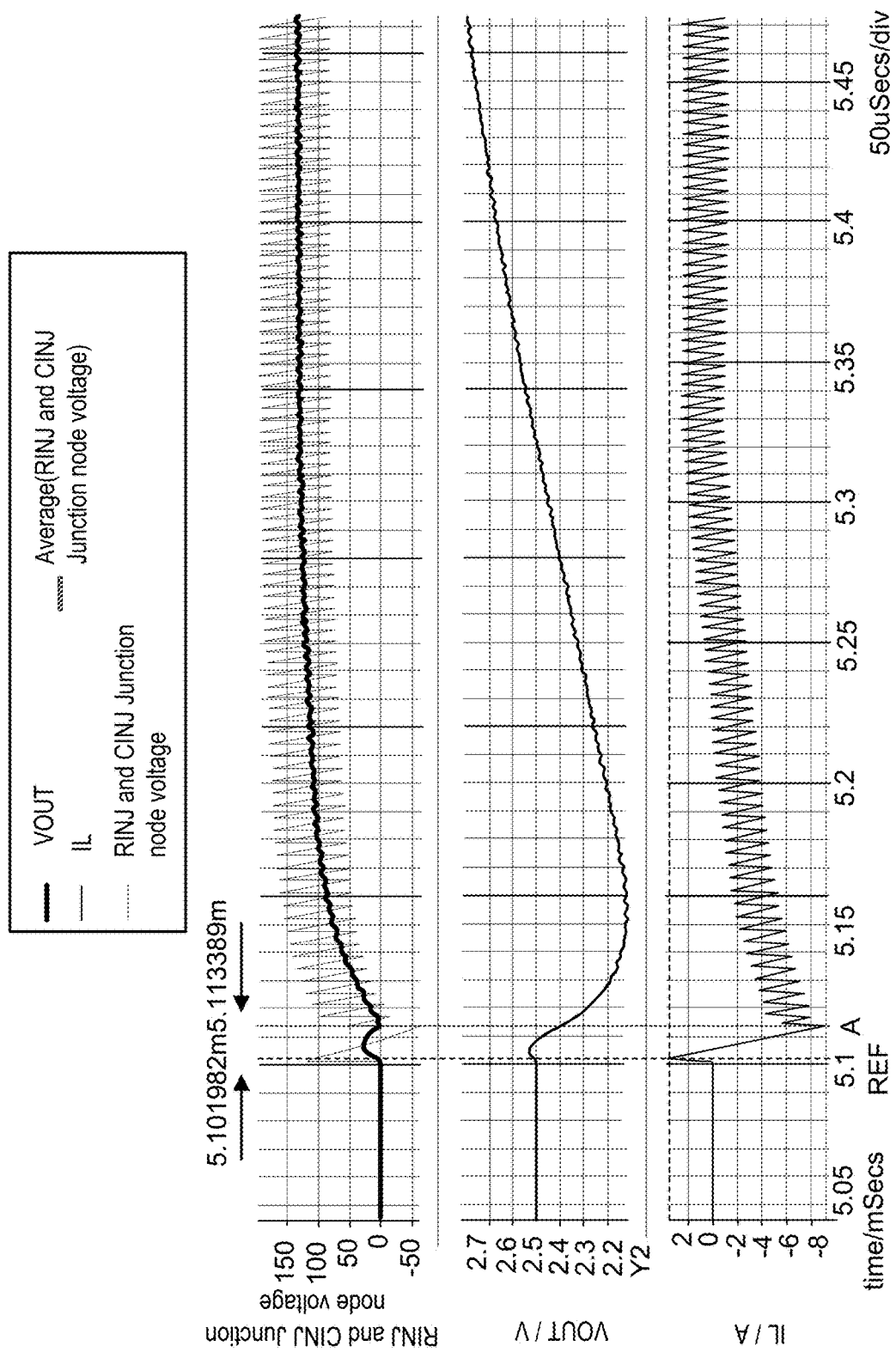
FIG. 11 shows an enlarged view of the initial switching portion waveforms shown in FIG. 10.

As shown in FIG. 10, the average inductor current (IL) is negative initially, which means that the converter is sinking current from the external prebias supply which is not acceptable in many applications. As shown in FIG. 11, the OFF time of the converter is much longer than what it should be for a converter switching at 250 KHz. This longer OFF time is because the RINJ and CINJ junction node has not reached its steady state value.

Figure 5:
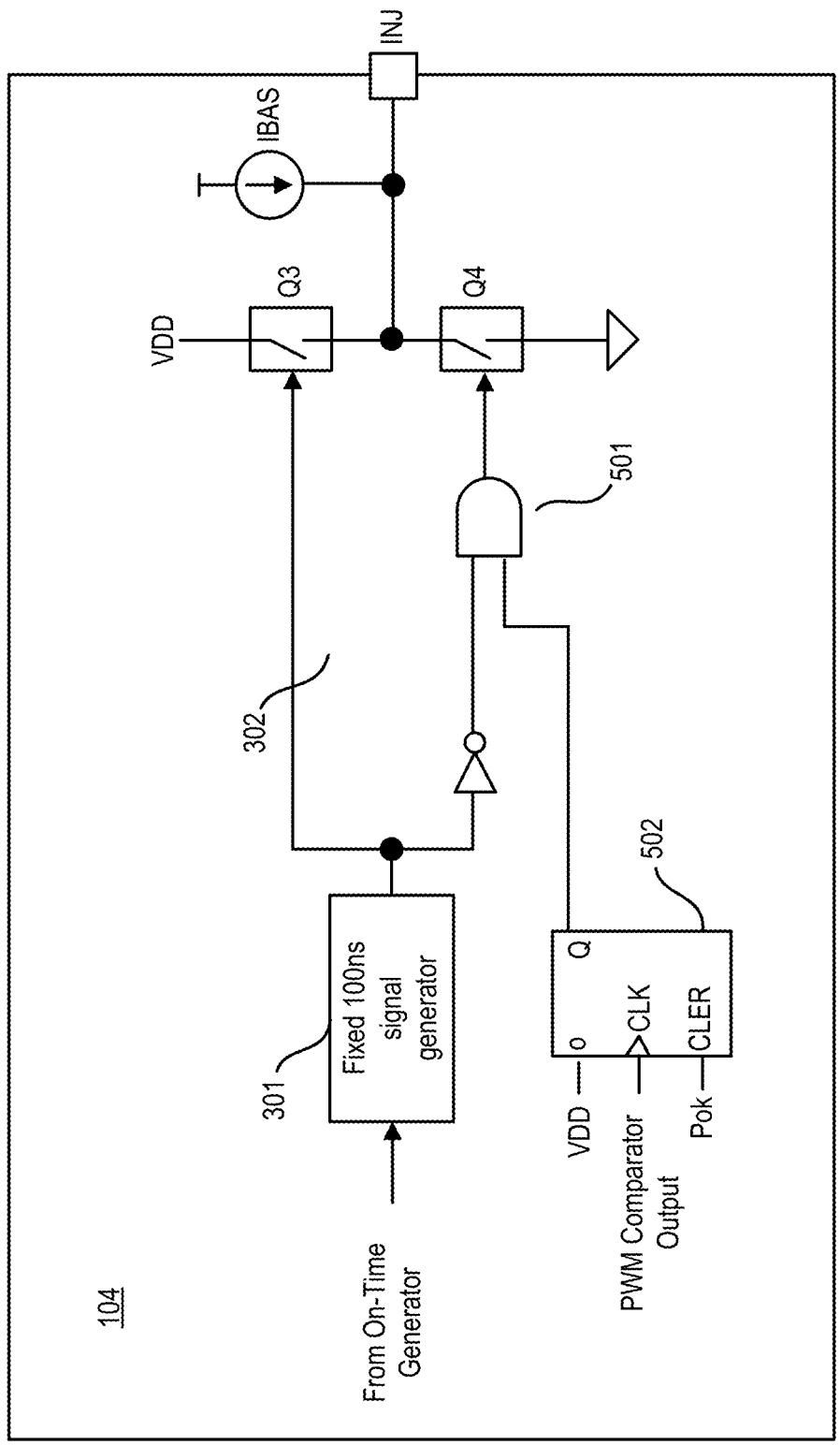
FIG. 5 shows block diagram of a modified INJ signal generator used in a constant on time buck converter with calibrated ripple injection to achieve proper prebias startup with CCM mode according to an exemplary embodiment.
Figure 6:
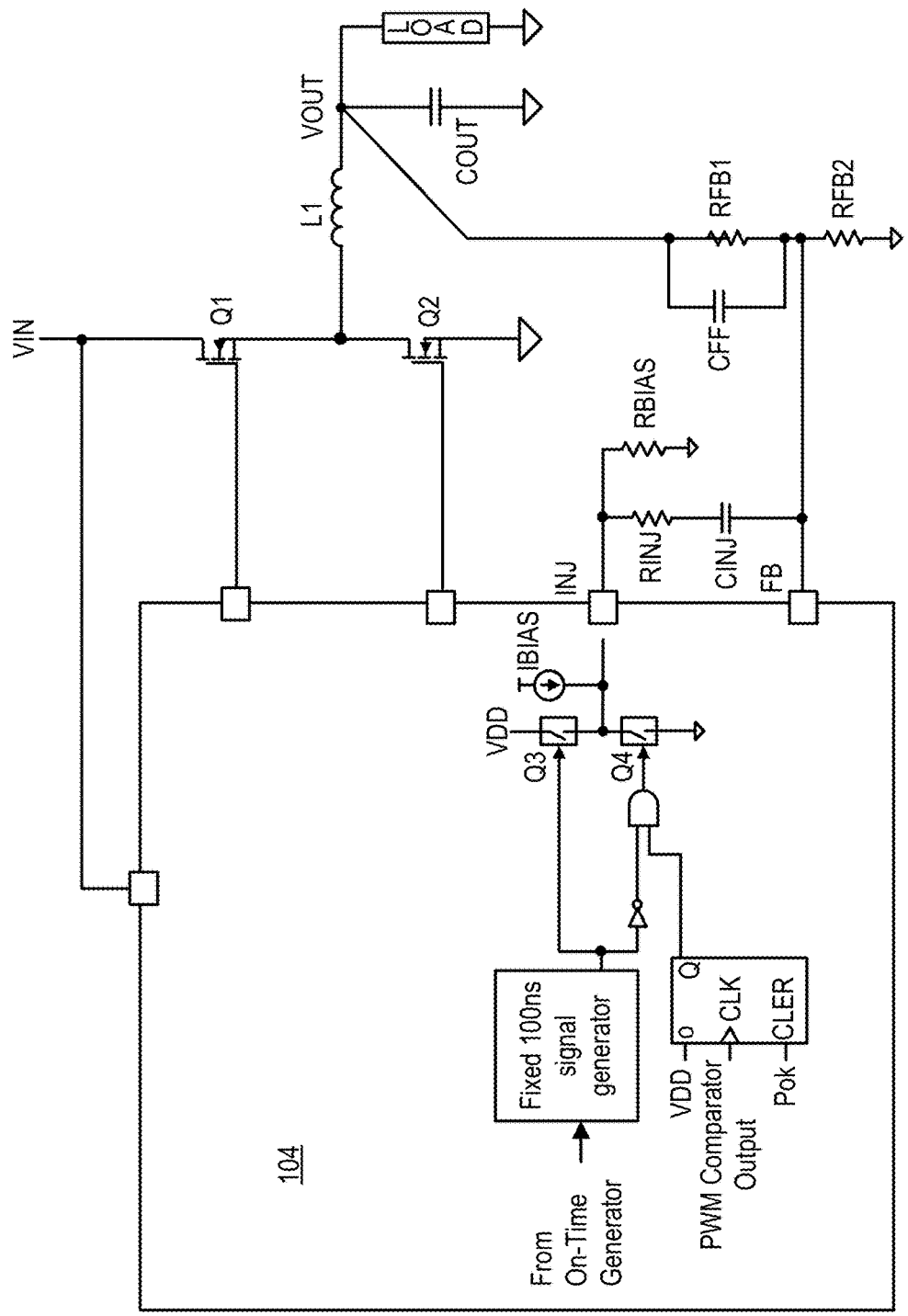
FIG. 6 shows an application circuit with modified INJ signal generator according to an exemplary embodiment.
Figure 7:
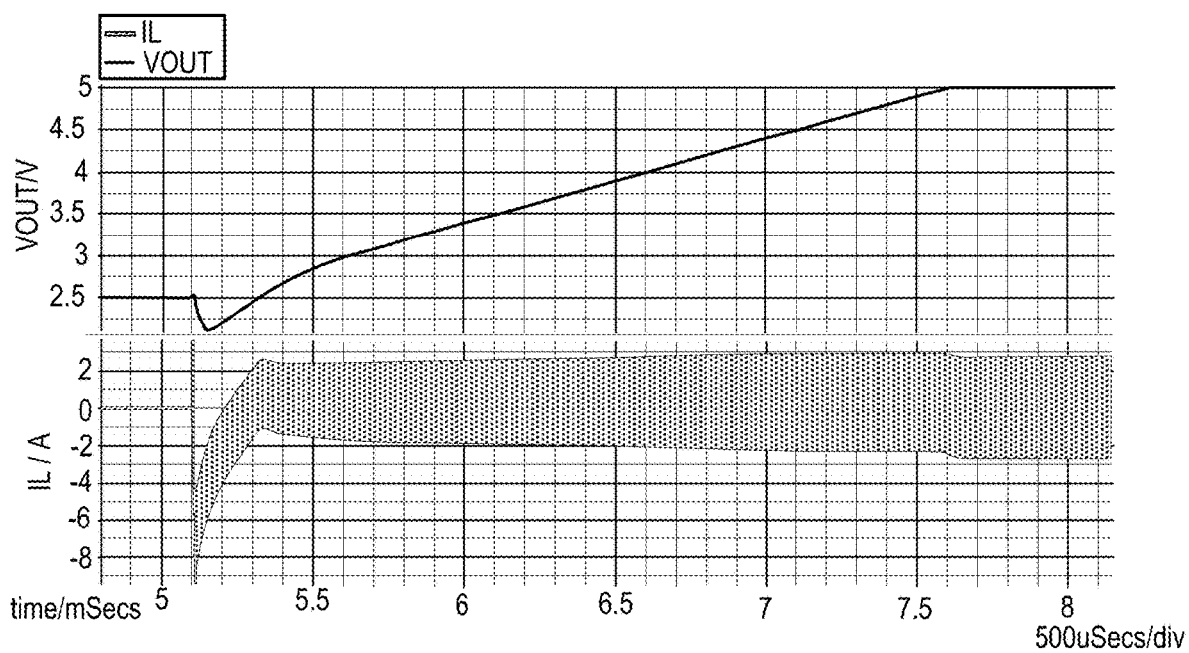
FIG. 7 shows the prebias startup simulation results of the prior art INJ signal generator shown in FIG. 1.
Figure 8:
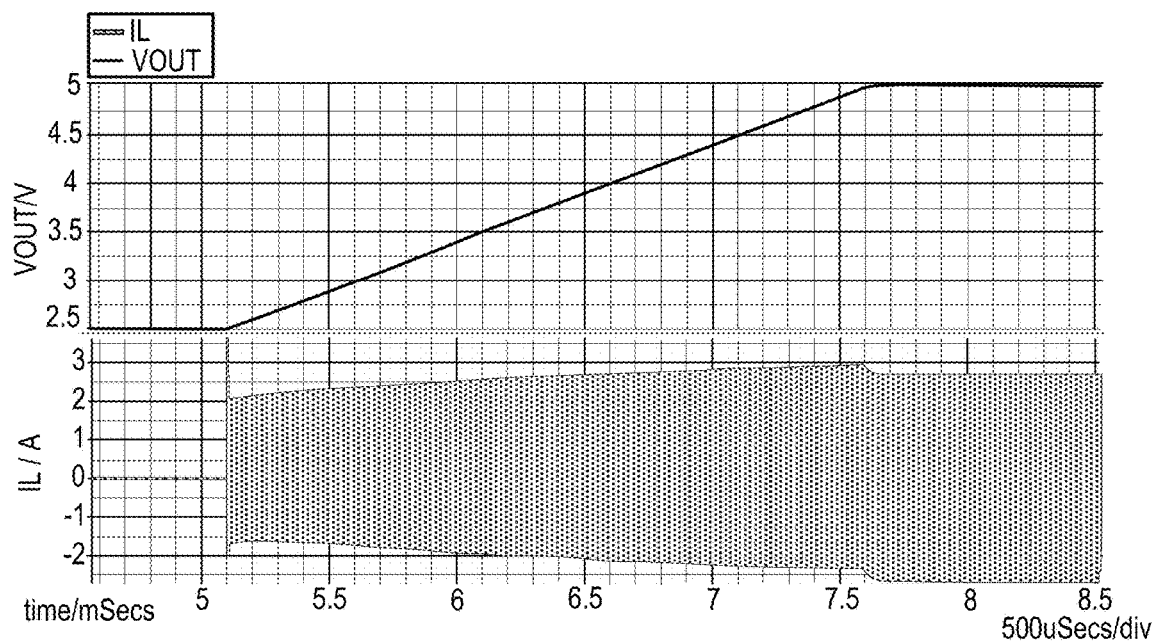
FIG. 8 shows the prebias startup simulation results of the exemplary embodiment INJ signal generator shown in FIGS. 5 and 6.

To achieve proper prebias startup behavior where the converter does not sink current from the prebias supply, the INJ signal generator is modified as shown in the exemplary embodiment of FIG. 5 and FIG. 6. The injection circuit 104 is modified in such a way that it remains in high impedance mode where both switches Q3 and Q4 are kept OFF until the first switching event happens. According to the exemplary embodiment, switch Q3 is controlled based on a signal received from a fixed 100 ns signal generator. The fixed 100 ns signal generator 301 may be coupled to the output of the ON-time generator 106 or the output of the PWM comparator 102. Switch Q4 of the exemplary embodiment is controlled based on the output of an AND gate 501. One input of the AND gate 501 may be coupled to the output of an inverter 302, and the input of the inverter 302 may be coupled to the fixed 100 ns signal generator 301. The other input of the AND gate may be coupled to the output of a D flip flop 502. The input of the D flip flop 502 may be coupled to VDD, and the CLK terminal of the D flip flop 502 may be coupled to the output of the PWM comparator 102 or the output of the ON-time generator 106. The CLEAR input of the D flip flop may be coupled to a power OK signal, which may be an enable signal for all blocks of the controller 100. In addition, a bias current (IBIAS) may be internally generated at the INJ pin, and may be coupled between the two switches Q3 and Q4. A resistor (RBIAS) may be connected at the INJ pin, and sets the INJ pin voltage to IBIAS*RBIAS until the first switching event occurs. By doing so, the RINJ and CINJ junction node gets charged to the IBIAS*RBIAS voltage before the device starts switching (if there is enough delay from the instant the device is enabled to the instant the device starts switching). If RBIAS is chosen based on the Equation 7 below, the RINJ & CINJ junction node voltage will be at its steady state voltage (given by Equation 1).

$$R_{BIAS} = \frac{V_{INJ(AVG)}}{I_{BIAS}} \quad \text{(Equation 7)}$$

Where $V_{INJ(Avg)}$ is the steady state voltage of the RINJ and CINJ junction node, which is given by Equation 1.

By substituting $V_{INJ(Avg)}$ into the Equation 7, RBIAS can be calculated using the Equation 8:

$$R_{BIAS} = V_{INJ} * \frac{t_{ON(INJ)}}{T_{SW}} * \frac{1}{I_{BIAS}} \quad \text{(Equation 8)}$$

According to an exemplary embodiment, $V_{INJ}$=5V, $t_{ON(INJ)}$=100 ns, fsw=250 KHz ($T_{Sw}$=4 us) and $I_{BIAS}$=5 uA. This results in a $R_{BIAS}$=25KΩ, according to this exemplary embodiment.

Figure 12:
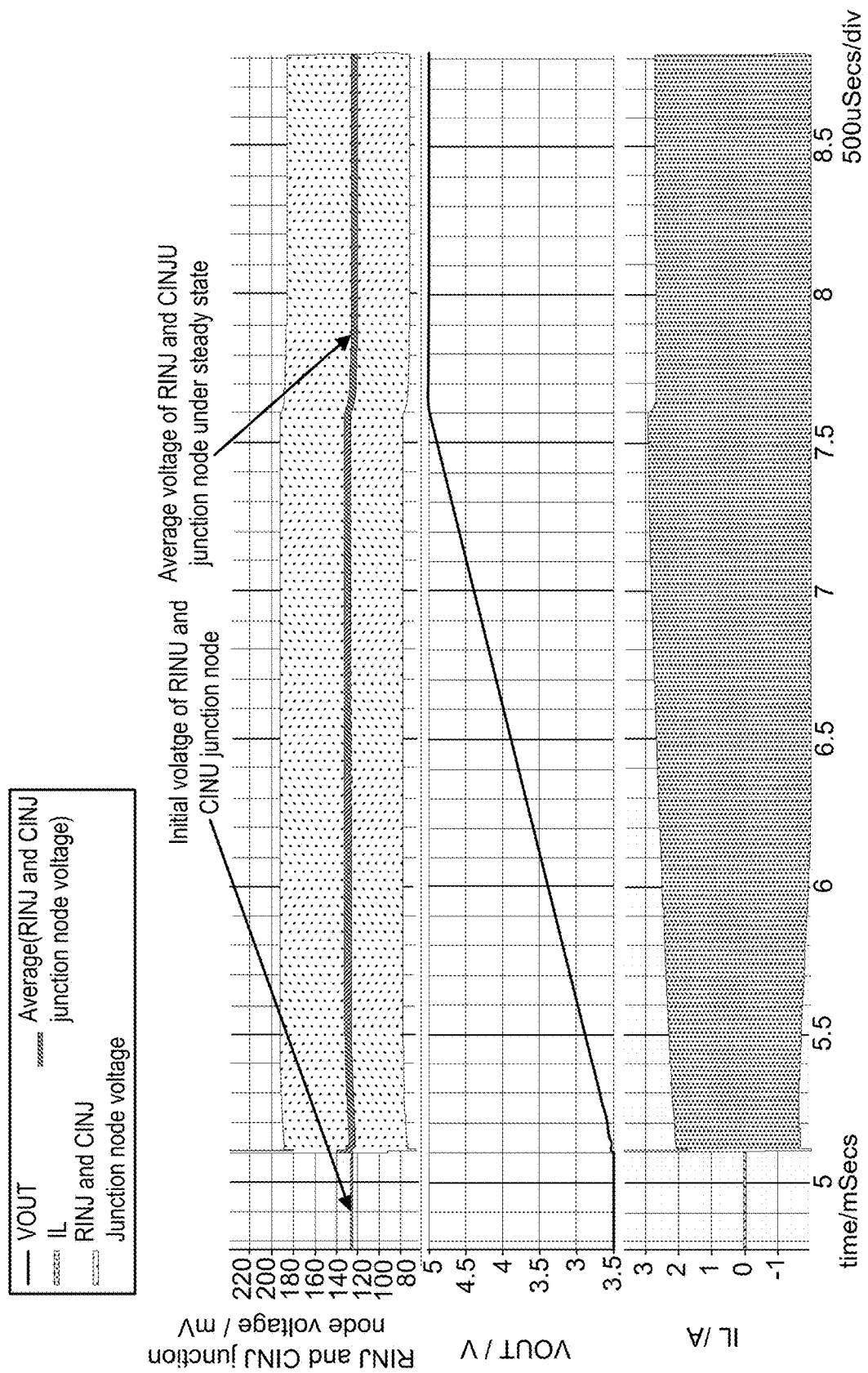
FIG. 12 shows the prebias startup simulation results corresponding to the INJ signal generated by the circuit of FIG. 2 showing the CINJ & RINJ junction node voltage.
Figure 13:
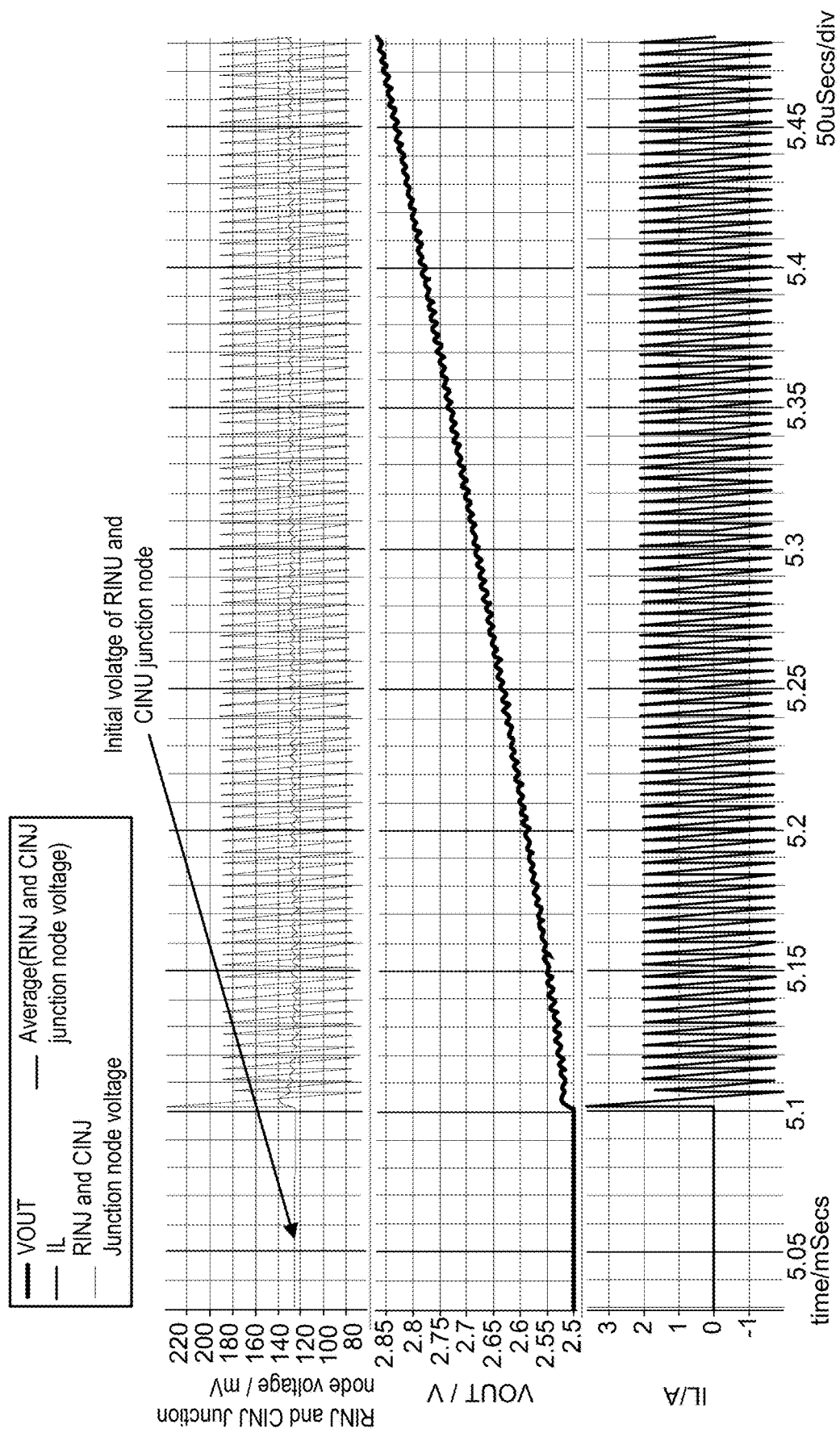
FIG. 13 shows an enlarged view of the initial switching portion waveforms shown in FIG. 12.

FIG. 12 shows simulation results according to an exemplary embodiment, showing waveforms for the output voltage (VOUT), inductor current (IL) and RINJ & CINJ junction node instantaneous and average voltage for the same prebias startup condition as mentioned for FIG. 10, with $R_{BIAS}$=25KΩ. FIG. 13 shows an enlarged view of the initial switching portion of FIG. 12. As shown in FIG. 12, $R_{BIAS}$ along with the INJ signal generator of the exemplary embodiment shown in FIGS. 5 and 6, sets the RINJ & CINJ junction node voltage at almost the same level as what it would be under steady state condition. This causes the very first OFF time of the converter to be close to the correct OFF time, and hence the average inductor current (IL) during the initial portion when the device starts switching is not negative. Hence the device according to an exemplary embodiment does not sink current from the prebias supply and output voltage keeps ramping up from the prebias level as shown in FIG. 13.

Figure 14:
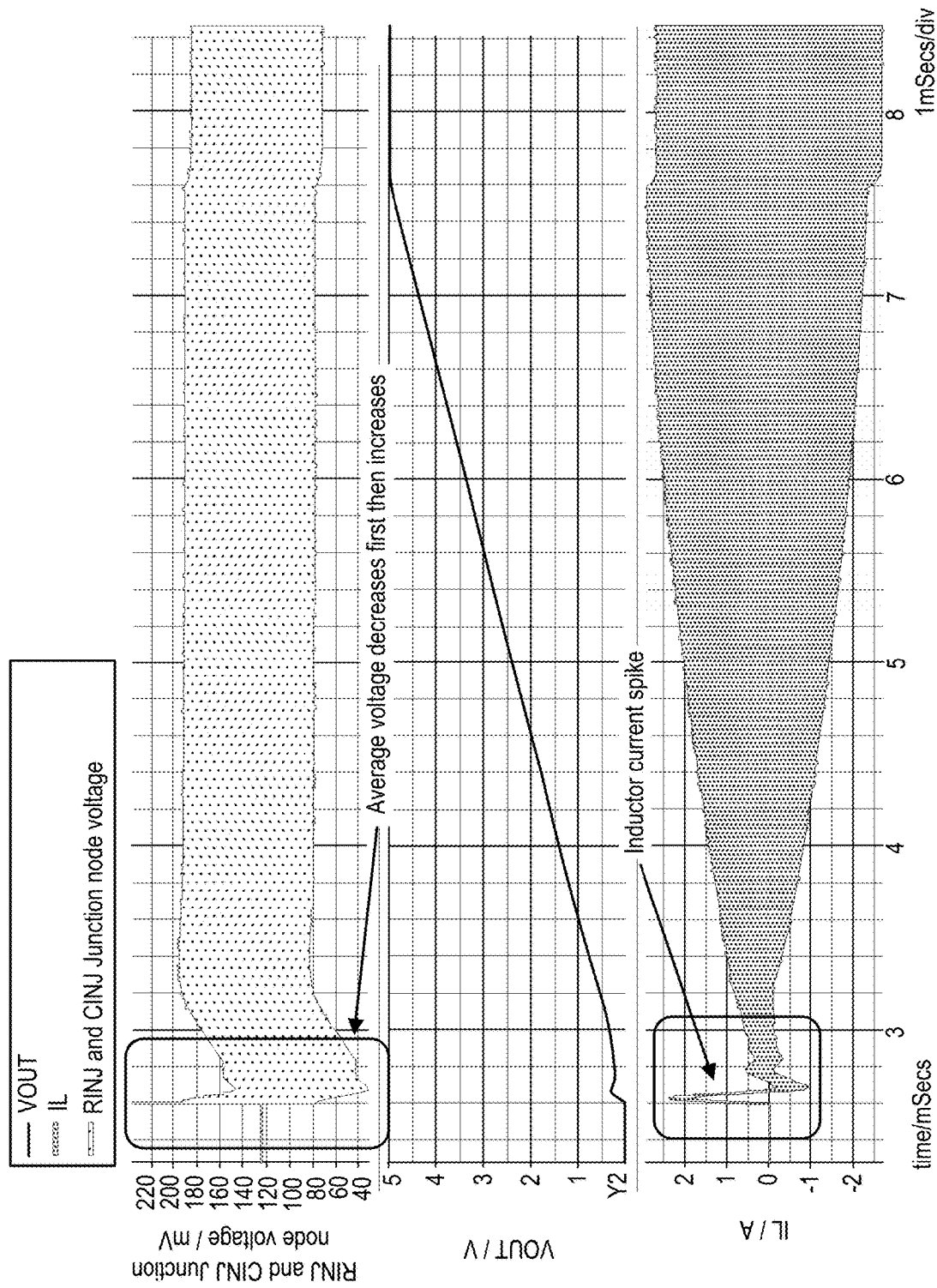
FIG. 14 shows the simulation results corresponding to the INJ signal generator of FIG. 2 without prebias voltage (i.e. normal startup).

FIG. 14 shows normal startup performance of the converter using the INJ signal generator circuit according to the exemplary embodiment of FIGS. 5 and 6. As shown in FIG. 14 there is a spike in inductor current (IL) at the beginning of the startup and the average voltage of the RINJ & CINJ junction node reduces initially and then increases. The reason for this is the converter operation in "Minimum Controllable ON time" (TONMIN) condition.

Most of switching converter MOSFET drivers have a minimum controllable on time, TONMIN. If the control loop requests an ON time that is smaller than TONMIN, then the MOSFET drivers force an ON time equal to TONMIN instead of the requested smaller ON time. This results in a longer OFF period in COT control-based switching converters, whereas it results in pulse skipping in fixed frequency switching converters. A longer OFF period in COT converters when the device operates under TONMIN increases the switching period and hence the switching frequency decreases. As the switching period becomes longer, the RINJ & CINJ junction node voltage becomes smaller (refer to Equation 1). This means that the average voltage of the RINJ & CINJ junction node is lower than the one that is calculated using Equation 1 if the converter operates under TONMIN, as the switching period is longer than the programmed switching period. This makes the RINJ & CINJ junction node initial voltage higher than what it is supposed to be, if RBIAS is calculated using Equation 8, which assumes that the device operates at the programmed switching frequency whereas the device actually operates at lower switching frequencies. This higher initial voltage of the RINJ & CINJ junction node voltage makes the converter OFF time smaller than what it should be. This results in a positive average voltage across inductor (L1) initially, which creates the current spike as shown in FIG. 14.

When the converter starts switching, the control loop brings down the RINJ & CINJ junction node voltage from the initial high value set by IBIAS*RBIAS to the value corresponding to the switching period corresponding to TONMIN as long the converter operates under TONMIN. The ON time requested by the control loop increases as the converter output voltage increases and eventually the converter comes out of TONMIN operation above which the converter switches at the programmed switching frequency and the RINJ & CINJ junction node voltage matches the value calculated using Equation 1. The inductor initial current spike can be as high as the converter current limit depending on the inductance value, input voltage, switching frequency etc.

Figure 15:
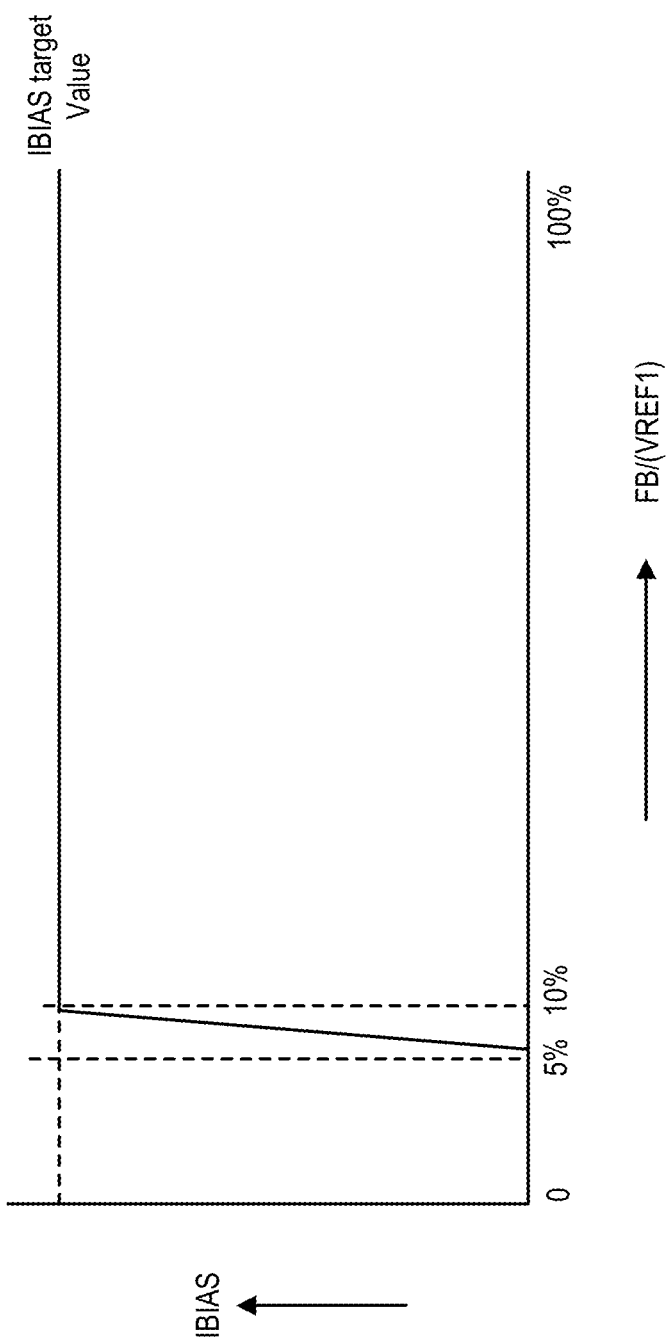
FIG. 15 shows an adaptive IBIAS scheme according to an exemplary embodiment.

According to an exemplary embodiment, the bias current IBIAS of the INJ signal generator may be adaptive based on the FB voltage (Adaptive IBIAS), instead of being a constant value, as shown in FIG. 15. According to the exemplary embodiment of FIG. 15, IBIAS is 0 uA when the FB voltage is <5% of VREF1, and is increased to its target value when the FB voltage is >10% of VREF1. The FB voltages below which IBIAS is 0 uA and above which IBIAS=100% of the target are design variables, and are not limited to the particular values shown in the exemplary embodiment. This method may provide the benefit of both eliminating the initial inductor current spike and achieving prebias start up without sinking current from a prebias supply.

Figure 16:
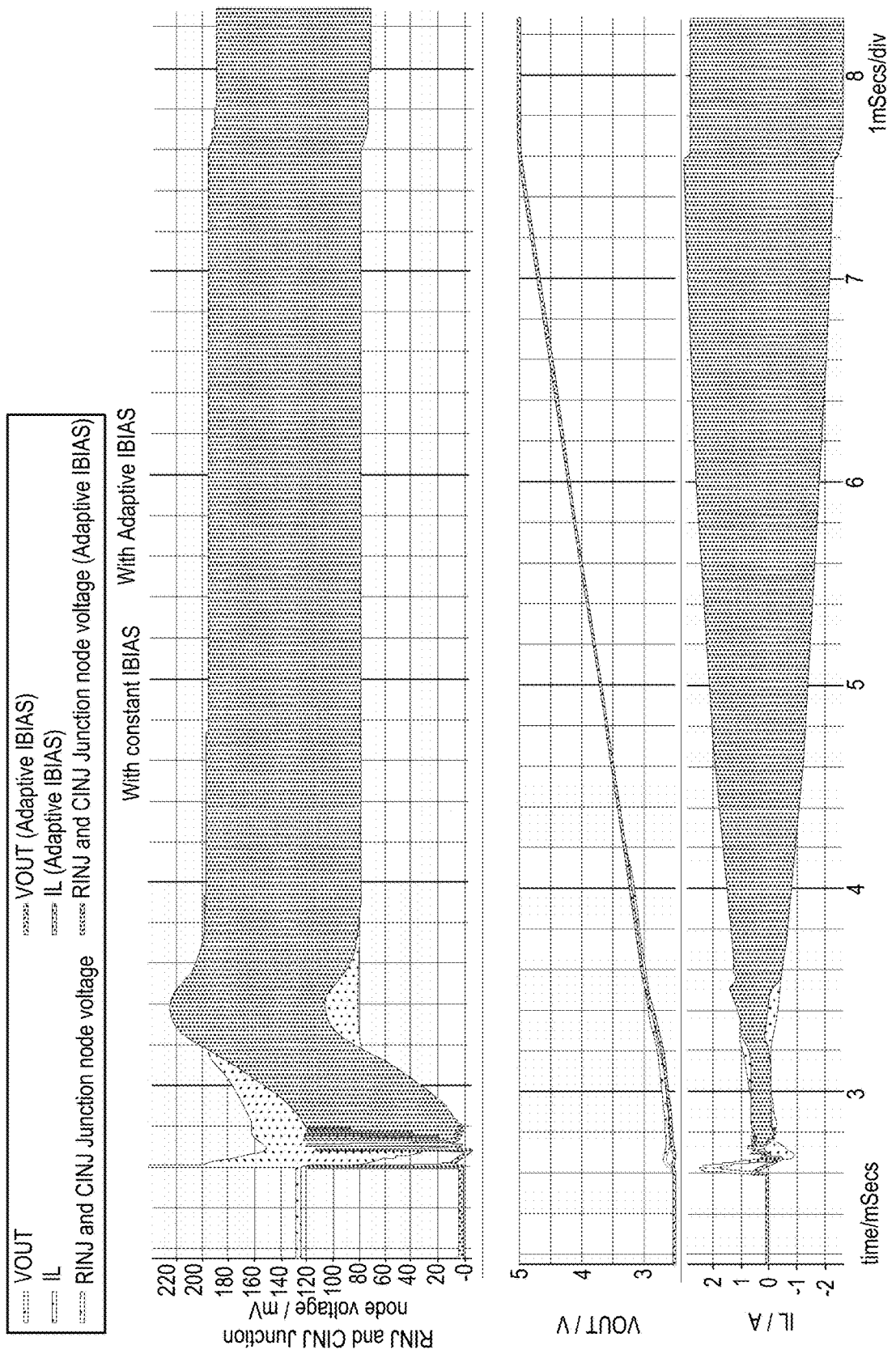
FIG. 16 shows the simulation results comparison with and without an adaptive IBIAS scheme under normal startup according to an exemplary embodiment.

FIG. 16 compares the simulation results of the converter with constant IBIAS and with adaptive IBIAS according to one or more exemplary embodiments. The initial inductor current spike is not present with the adaptive IBIAS scheme according to an exemplary embodiment, as shown in FIG. 16. As the IBIAS is 0 uA initially, the RINJ & CINJ junction node voltage is also at 0V with the adaptive IBIAS scheme.

Figure 17:
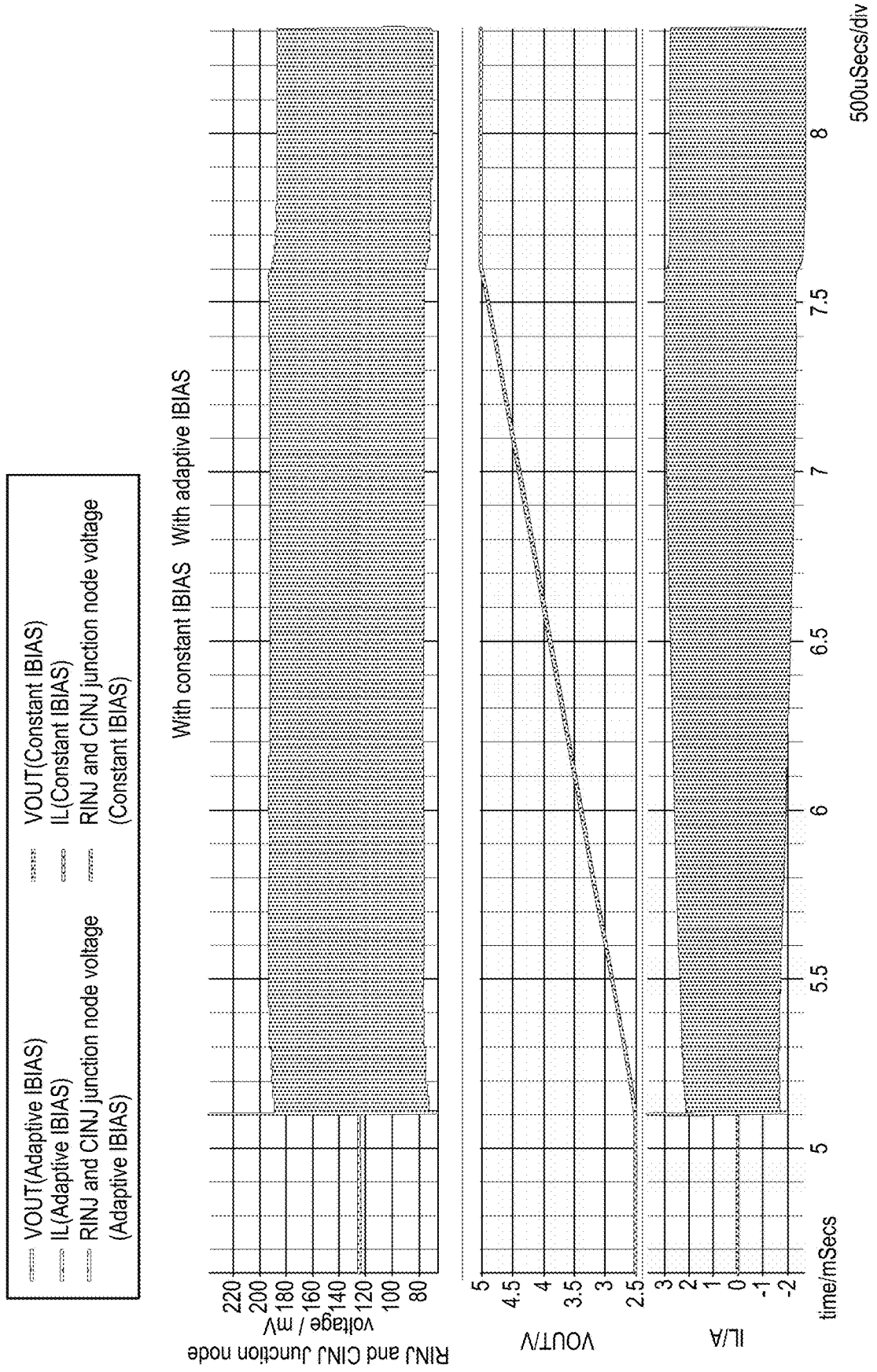
FIG. 17 shows the pre-bias startup simulation results comparison with and without an adaptive IBIAS scheme according to an exemplary embodiment.

FIG. 17 compares the prebias startup performance of the converter using constant IBIAS and adaptive IBIAS schemes, according to one or more exemplary embodiments. It can be observed from FIG. 17 that the waveforms are overlapping each other because the device behavior is the same between the two cases. This is because the prebias voltage, which is 2.5V in this example, is 50% of the target output voltage, and IBIAS is at its 100% value because the FB voltage corresponding to the 2.5V prebias voltage is >10% of VREF1 (i.e. prebias voltage is greater than 10% of the target output voltage). Therefore, if the prebias voltage is greater than or equal to 10% of the target output voltage, there will be no difference between the constant IBIAS and adaptive IBIAS methods. Both the methods may ensure that the converter does not sink current from prebias supply if the prebias voltage is higher than the FB threshold above which IBIAS is 100% of its target value (refer to FIG. 15).

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A constant on-time controller for a buck converter, the controller comprising:
a pulse width modulator (PWM) comparator that generates an on-time request;
an error amplifier that regulates an average feedback voltage to an internal reference voltage, and passes a feedback node ripple signal to an input of the PWM comparator;
an on-time generator that outputs an on-time signal that controls an on-time of the buck converter based on the on-time request;
a MOSFET driver that drives the buck converter based on the output of the on-time generator; and
an injection signal generator coupled to said on-time generator, said injection signal generator comprising a first switch and a second switch, a fixed signal generator, and a bias current source;
wherein said first switch is coupled to said second switch;
wherein said first and second switches are coupled to said fixed signal generator, and to an output of the injection signal generator;
wherein said bias current source is coupled between said first and second switches and said output of said injection signal generator; and
wherein the error amplifier receives a feedback voltage based on the output of the injection signal generator.

2. The controller of claim 1, wherein the injection signal generator further comprises an AND gate comprising an output that is coupled to the second switch, a first input that is coupled via an inverter to the fixed signal generator, and a second input that is coupled to a flip flop that receives the on-time request from the PWM comparator.

3. The controller of claim 2, wherein the flip flop comprises an input terminal coupled to a supply voltage, a clock terminal that is coupled to an output of the PWM comparator, and a clear terminal that is coupled to an enable signal of the controller.

4. The controller of claim 1, wherein the bias current source is a constant bias current source.

5. The controller of claim 1, wherein the bias current source is an adaptive bias current source that outputs a bias current based on the feedback voltage.

6. The controller of claim 5, wherein the bias current is generated based on a comparison of the feedback voltage to a reference voltage.

7. A device comprising:
a buck converter power stage;
a controller coupled to the buck converter power stage; and
a ripple voltage circuit coupled to the buck converter power stage output and the controller;
wherein said controller comprises:
a pulse width modulator (PWM) comparator that generates an on-time request and is coupled to a feedback terminal of the controller;
an on-time generator that outputs an on-time signal that controls an on-time of the buck converter based on the on-time request;
a MOSFET driver that drives the buck converter based on the output of the on-time generator; and
an injection signal generator coupled to said on-time generator, said injection signal generator comprising a first switch and a second switch, a fixed signal generator, and a bias current source;
wherein said first switch is coupled to said second switch;
wherein said first and second switches are coupled to said fixed signal generator, and to an output of the injection signal generator;
wherein said bias current source is coupled between said first and second switches and said output of said injection signal generator; and
wherein the PWM comparator receives a feedback voltage based on the output of the injection signal generator;
wherein said ripple voltage circuit comprises an injection resistor, an injection capacitor, and a bias resistor;
wherein said injection resistor comprises a first terminal coupled to the output of the injection signal generator and a second terminal coupled to said injection capacitor;
wherein said bias resistor comprises a first terminal coupled to the first terminal of the injection resistor and a second terminal coupled to ground; and
wherein said injection capacitor comprises a first terminal coupled to said second terminal of said injection resistor and a second terminal coupled to said feedback terminal of the controller.

8. The device of claim 7, wherein the ripple voltage circuit further comprises a resistive voltage divider having a first resistor and a second resistor, and a feed forward capacitor coupled in parallel with the first resistor of said resistive voltage divider;

wherein the feedback terminal of the controller is coupled between the first and second resistors of said resistive voltage divider; and wherein an output of the buck converter is coupled to the first resistor of said resistive voltage divider and the feed forward capacitor.

9. The device of claim 7, wherein the injection signal generator further comprises an AND gate comprising an output that is coupled to the second switch, a first input that is coupled via an inverter to the fixed signal generator, and a second input that is coupled to a flip flop that receives the on-time request from the PWM comparator.

10. The device of claim 9, wherein the flip flop comprises an input terminal coupled to a supply voltage, a clock terminal that is coupled to an output of the PWM comparator, and a clear terminal that is coupled to an enable signal of the controller.

11. The device of claim 7, wherein the bias current source is a constant bias current source.

12. The device of claim 7, wherein the bias current source is an adaptive bias current source that outputs a bias current based on the feedback voltage.

13. The device of claim 12, wherein the bias current is generated based on a comparison of the feedback voltage to a reference voltage.

14. An injection signal generator for generating a feedback ripple voltage for a buck converter controller, said injection signal generator comprising: a first switch and a second switch, a fixed signal generator, and a bias current source; wherein said first switch is coupled to said second switch; wherein said first and second switches are coupled to said fixed signal generator, and to an output of the injection signal generator;

wherein said bias current source is coupled between said first and second switches and said output of said injection signal generator;

wherein injection signal generator further comprises:

an AND gate comprising an output that is coupled to the second switch, a first input that is coupled via an inverter to the fixed signal generator, and a second input that is coupled to a flip flop that receives an on-time request from a pulse width modulator (PWM) comparator.

15. The injection signal generator of claim 14, wherein the flip flop comprises an input terminal coupled to a supply voltage, a clock terminal that is configured to receive the on-time request, and a clear terminal that is configured to receive an enable signal of the controller.

16. The injection signal generator of claim 14, wherein the bias current source is a constant bias current source.

17. The injection signal generator of claim 14, wherein the bias current source is an adaptive bias current source that outputs a bias current based on a feedback voltage.

18. The injection signal generator of claim 17, wherein the bias current is generated based on a comparison of the feedback voltage to a reference voltage.

19. A method for controlling a buck converter, the method comprising:

regulating an average feedback voltage to an internal reference voltage;

generating an on-time request using a PWM comparator based on a feedback voltage;

outputting an on-time signal that controls an on-time of the buck converter based on the PWM comparator on-time request;

driving the buck converter based on the on-time signal;

creating a feedback voltage ripple using an injection signal generator and external components;

outputting a bias current to achieve a target voltage before a controller that controls the buck converter begins switching to ensure proper pre-bias startup; and outputting an injection signal by the injection signal generator which generates a pulse voltage source with a fixed high duration and low for the remaining switching period under steady state conditions;

wherein the said injection generator also consists of a current source;

wherein the said current source is adaptive with the feedback voltage.

* * * * *